(12) United States Patent
Cimmino et al.

(10) Patent No.: US 10,696,597 B2
(45) Date of Patent: Jun. 30, 2020

(54) PRECURSOR SOLUTION AND METHOD FOR THE PREPARATION OF A LEAD-FREE PIEZOELECTRIC MATERIAL

(71) Applicant: STMicroelectronics S.R.L., Agrate Brianza (IT)

(72) Inventors: Angela Cimmino, Caserta (IT); Giovanna Salzillo, Teverola (IT); Valeria Casuscelli, Naples (IT); Andrea Di Matteo, Naples (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 380 days.

(21) Appl. No.: 15/192,648

(22) Filed: Jun. 24, 2016

(65) Prior Publication Data
US 2017/0152186 A1 Jun. 1, 2017

(30) Foreign Application Priority Data

Dec. 1, 2015 (IT) .................. 102015000078953
Dec. 1, 2015 (IT) .................. 102015000078965

(51) Int. Cl.
*C04B 35/49* (2006.01)
*C04B 35/622* (2006.01)
(Continued)

(52) U.S. Cl.
CPC ........ *C04B 35/4682* (2013.01); *C04B 35/465* (2013.01); *C04B 35/49* (2013.01);
(Continued)

(58) Field of Classification Search
CPC .......... C04B 35/4682; C04B 35/62222; C04B 35/64; C04B 2325/3434; C04B 2325/768
See application file for complete search history.

(56) References Cited

U.S. PATENT DOCUMENTS 4,816,072 A * 3/1989 Harley .................. A61L 2/0017
106/287.18
8,182,713 B2 5/2012 Xiaobing et al.
(Continued)

FOREIGN PATENT DOCUMENTS

CN 1267654 A 9/2000
CN 1350071 A 5/2002
(Continued)

OTHER PUBLICATIONS

Castkova et al., "Chemical Synthesis, Sintering and Piezoelectric Properties of $Ba_{0.85}Ca_{0.15}Zr_{0.1}Ti_{0.9}O_3$ Lead-Free Ceramics," *Journal of the American Ceramic Society* 98(8):2373-2380, 2015.
(Continued)

*Primary Examiner* — Jun Li
(74) *Attorney, Agent, or Firm* — Seed IP Law Group LLP

(57) ABSTRACT

The present disclosure relates to a precursor solution for the preparation of a ceramic of the BZT-αBXT type, where X is selected from Ca, Sn, Mn, and Nb, and α is a molar fraction selected in the range between 0.10 and 0.90, said solution comprising: 1) at least one barium precursor compound; 2) a precursor compound selected from the group consisting of at least one calcium compound, at least one tin compound, at least one manganese compound, and at least one niobium compound; 3) at least one anhydrous precursor compound of zirconium; 4) at least one anhydrous precursor compound of titanium; 5) a solvent selected from the group consisting of a polyol and mixtures of a polyol and a secondary solvent selected from the group consisting of alcohols, carboxylic acids, esters, ketones, ethers, and mixtures thereof; and 6) a chelating agent, as well as method of using the same.

11 Claims, 8 Drawing Sheets

(51) Int. Cl.

| | |
|---|---|
| C04B 35/624 | (2006.01) |
| C04B 35/626 | (2006.01) |
| C04B 35/64 | (2006.01) |
| C04B 35/468 | (2006.01) |
| C09D 1/00 | (2006.01) |
| C04B 35/634 | (2006.01) |
| C04B 35/632 | (2006.01) |
| C04B 35/465 | (2006.01) |
| C09D 7/61 | (2018.01) |
| C09D 5/03 | (2006.01) |

(52) U.S. Cl.
CPC ........ *C04B 35/624* (2013.01); *C04B 35/6264* (2013.01); *C04B 35/62222* (2013.01); *C04B 35/62675* (2013.01); *C04B 35/62685* (2013.01); *C04B 35/6325* (2013.01); *C04B 35/63444* (2013.01); *C04B 35/63488* (2013.01); *C09D 1/00* (2013.01); *C09D 5/03* (2013.01); *C09D 7/61* (2018.01); *C04B 2235/3208* (2013.01); *C04B 2235/3215* (2013.01); *C04B 2235/3232* (2013.01); *C04B 2235/3234* (2013.01); *C04B 2235/3244* (2013.01); *C04B 2235/3251* (2013.01); *C04B 2235/3262* (2013.01); *C04B 2235/3293* (2013.01); *C04B 2235/441* (2013.01); *C04B 2235/449* (2013.01); *C04B 2235/72* (2013.01); *C04B 2235/768* (2013.01); *C04B 2235/81* (2013.01)

(56) References Cited

U.S. PATENT DOCUMENTS

| | | | |
|---|---|---|---|
| 9,214,279 B2* | 12/2015 | Yamashita | B82Y 30/00 |
| 2009/0136658 A1* | 5/2009 | Yoshinaka | C07C 51/412 427/126.2 |
| 2013/0112910 A1* | 5/2013 | Noguchi | C23C 18/1216 252/62.9 PZ |
| 2016/0284969 A1* | 9/2016 | Sumi | H01L 41/1873 |

FOREIGN PATENT DOCUMENTS

| | | |
|---|---|---|
| CN | 104098331 A | 10/2014 |
| CN | 104761259 A | 7/2015 |
| CN | 106810252 A | 6/2017 |
| WO | WO-9013149 A1 * | 11/1990 ......... H01L 41/0815 |

OTHER PUBLICATIONS

Gao et al., "Study of dielectric characteristics of graded $Ba_{1-x}Ca_x Zr_{0.05}Ti_{0.95}O_3$ thin films grown by a sol-gel process," *J Sol-Gel Sci. Technol.* 45(1): 51-55, 2008.

Hsieh et al., "A study on the synthesis of $(Ba,Ca)(Ti,Zr)O_3$ nano powders using Pechini polymeric precursor method," *Ceramics International* 38(1):755-759, 2012.

Jalalian et al., "Ferroelectric and Ferromagnetic Nanofibers: Synthesis, Properties and Applications," *Journal of Physics: Conference Series* 352(1):1-9, 2012.

Kang et al., "$(1-x)Ba(Zr_{0.2}Ti_{0.8})O_3$-$x(Ba_{0.7} Ca_{0.3})TiO_3$ Ferroelectric Thin Films Prepared from Chemical Solutions" *J. Am. Ceram. Soc.*, 95(3):986-991, 2012.

Toyoda et al., "Preparation and Characterization of $(Ba,Ca)(Ti,Zr)O_3$ Thin Films Through Sol-Gel Processing," *Journal of Sol-Gel Science and Technology* 16(1-2):7-12, 1999.

Wang et al., "Infrared optical properties of ferroelectric $0.5BaZr_{0.2} Ti_{0.8} O_3$—$0.5Ba_{0.7}Ca_{0.3}TiO_3$ thin films," *Ceramics International* 41(1):475-480, 2015.

Wu et al., "Electrospinning lead-free $0.5Ba(Zr_{0.2}Ti_{0.8})O_3$-$0.5(Ba_{0.7} Ca_{0.3})TiO_3$ nanowires and their application in energy harvesting," *Journal of Materials Chemistry A* 1(25):7332-7338, 2013.

Bao et al., "A modified lead-free piezoelectric BZT-$_x$BCT system with higher $T_C$," *Journal of Physics D: Applied Physics* 43(46):465401, 2010. (5 pages).

Panda, "Review: environmental friendly lead-free piezoelectric materials," *Journal of Materials Science* 44: 5049-5062, 2009.

Su et al., "Poling dependence and stability of piezoelectric properties of $Ba(Zr_{0.2}Ti_{0.8})O_3$—$(Ba_{0.7}Ca_{0.3})TiO_3$ ceramics with huge piezoelectric coefficients," *Current Applied Physics 11*: S120-S123, 2011.

Tan et al., "Ferroelectrie and piezoelectric properties of $(1-x)BaTi_{0.8} Zr_{0.2}O_3$-$xBa_{0.7}Ca_{0.3}TiO_3$ ceramics prepared by sol-gel technique," *Advanced Material's Research* 148-149: 1480-1485, 2010.

Chi et al., "Interface Optimization and Electrical Properties of $0.5Ba(Zr_{0.2}Ti_{0.8})O_3$-$0.5(Ba_{0.7}Ca_{0.3})TiO_3$ Thin Films Prepared by a Sol-Gel Process," *J. Phys, Chem. C* 118:15220-15225, 2014.

Li et al., "$LaNiO_3$ seed layer induced enhancement of piezoelectric properties in (100)-oriented $(1-x)BZT$-$xBCT$ thin films," *Journal of the European Ceramic Soc.* 35(7):2041-2049, 2015.

Liu et al., "Large Piezoelectric Effect in Pb-Free Ceramics," *Phys. Review Letters* 103(25):257602-1-257601-4, 2009.

Tadros, "Physical Stability of Suspension Concentrates," *Advances in Colloid and Interface Science* 12:141-261, 1980.

Wang et al., "Crystallization, phase evolution and ferroelectric properties of sol-gel-synthesized $Ba(Ti_{0.8}Zr_{0.2})O_3$-$x(Ba_{0.7} Ca_{0.3})TiO_3$ thin films," *J. Mater. Chem. C*, 1:522-530, 2013.

Yang et al., "Preparation and characterization of $(Ba_{0.88}Ca_{0.12}) (Zr_{0.12}Ti_{0.88})O_3$ powders and ceramics produced by sol-gel process," *Advanced Materials Research* 148-149: 1062-1066, 2011.

* cited by examiner

PRECURSOR SOLUTION AND METHOD FOR THE PREPARATION OF A LEAD-FREE PIEZOELECTRIC MATERIAL

BACKGROUND

Technical Field

The present disclosure relates to a precursor solution and to a method for the preparation of a piezoelectric material that is free from lead and from chemical compounds that are mutagenic and carcinogenic for humans and toxic for the environment.

Description of the Related Art

Piezoelectric materials are materials that are able to expand or contract when a voltage is applied (electrostrain effect), and conversely to generate a voltage if they are subjected to a pressure (piezoelectric effect).

They consequently constitute a very important class of materials that are able to convert mechanical energy into electrical energy, and vice versa. They have been in fact widely used in products in the field of energy conversion, such as actuators and sensors, and are widespread in common applications but also in advanced technologies, performing a fundamental role in today's society.

Piezoelectric materials have a crystalline structure of the perovskite type. Mineral perovskite is a calcium titanate, having the chemical formula $CaTiO_3$. The family of perovskite oxides has a generic composition $ABO_3$, where the element A (represented in grey in FIGS. 1A and 1B) is 12-fold coordinated with respect to oxygen (shown in white in FIGS. 1A and 1B) and the element B (shown in black in FIGS. 1A and 1B) presents octahedral coordination with oxygen. The sites A are positioned at the corners of a cube, the site B is at the center of the cube, and the oxygen atoms are positioned at the center of each face. Alternatively, the structure could be represented with the sites B at the corners of the cube, the site A at the center of the cube, and the oxygen atoms at the midpoint of each edge (FIGS. 1A and 1B, respectively).

The perovskite-type structure shows excellent tolerance to variations in its composition and to possible distortions of the final material thanks to its capacity to adapt to any misalignment in the balance between the lengths of the AO and BO bonds, thus enabling the existence of a large number and variety of stoichiometric compounds.

The distortions, for example tetragonal (FIG. 2), orthorhombic, rhombohedral, and monoclinic distortions, in fact give rise to changes in the symmetry of the crystal, where one or more cations displace from positions with high symmetry in the lattice, this resulting in a ferroelectric or anti-ferroelectric behavior. In other words, a spontaneous polarization is caused when the center of the positive charge and the center of the negative charge within the unitary cell do not coincide.

However, in a ferroelectric material spontaneous polarization occurs but a re-orientation of polarization by an electrical field can be done.

The most widespread family of piezoelectric materials is that of lead-zirconate-titanate (PZT) ceramics, owing to the high values of the piezoelectric coefficient, of the dielectric constants, and of the coupling factors. These properties have been observed in compositions in the proximity of a morphotropic-phase boundary (MPB). The MPB presents a slight dependence upon temperature so that the stability of the properties is reached over a wide temperature range.

However, since PZT contains a large amount of toxic lead, the use of these materials is subject to stringent standards for environmental reasons.

Consequently, it is desirable to develop a material that has a lower environmental impact and is lead-free and that presents a piezoelectric coefficient comparable to that of PZT (200-710 pC/N).

In the last few years, various lead-free systems have consequently been investigated, amongst which barium titanate, titanates of bismuth and an alkaline metal, and niobates.

Wenfeng Liu et al., in "Large Piezoelectric Effect in Pb-free Ceramics", Phys. Rev. Letters, (2009), 103, 257602 and in US20110037015, studied the ceramic $(1-\alpha)Ba(Zr_{0.2}Ti_{0.8})O_3-\alpha(Ba_{0.7}Ca_{0.3})TiO_3$ (BZT-$\alpha$BCT), where $\alpha$ is a molar fraction comprised between 0 and 1, obtained using a conventional solid-state reaction method.

The above authors reported that the existence of a cubic-rhombohedral-tetragonal (C-R-T) triple point in the phase diagram located at x=0.32 and T=57° C. resulted in materials with high piezoelectricity, with values comparable to those of piezoelectric transducers made of lead zirconate titanate (PZT) with high sensitivity or high polarization. In particular, the authors showed that ceramics having a perovskite structure and a complex composition of the type $0.5Ba(Ti_{0.8}Zr_{0.2})O_3-0.5(Ba_{0.7}Ca_{0.3})TiO_3$ (BZT-0.5BCT) have a high piezoelectric coefficient $d_{33}$ of up to 620 pC/N at a relatively low Curie temperature (Tc~93° C.), whereas BZT-BCT composite ceramics present a higher Tc of approximately 114° C. for x=0.53.

Single-crystal BZT-BCT composites at the morphotropic-phase boundary (MPB) have shown a high piezoelectric coefficient $d_{33}$ of approximately 1500 to 2000 pC/N. By optimizing the poling conditions for ceramic composites of the $Ba(Ti_{0.8}Zr_{0.2})O_3-0.5(Ba_{0.7}Ca_{0.3})TiO_3$ type, a high piezoelectric coefficient $d_{33}$ has been observed of approximately 630 pC/N, with a planar electromechanical factor of 56%.

FIG. 3 presents a comparison between the piezoelectric coefficient $d_{33}$ of a BZT-0.5BCT material, the piezoelectric coefficients of other lead-free piezoelectric materials, and those of the materials of the PZT family. As emerges clearly from the figure, not only do lead-free BZT-BCT materials have piezoelectric coefficients at least twice those of other piezoelectric materials, but moreover these piezoelectric properties are better than those of the majority of PZT materials.

However, the technique of preparation by conventional solid-state reaction is quite complex. There have thus been developed techniques that are simpler and less costly and that enable a better control over the stoichiometry of the final compound, for example sol-gel techniques.

Using the sol-gel technique, Xianghua Liu et al., as described in "Preparation and Characterization of $(Ba_{0.88}Ca_{0.12})(Zr_{0.12}Ti_{0.88})O_3$ Powders and Ceramics Produced by Sol-Gel Process", Advanced Materials Research (2010), 148-149, 1062-1066, prepared lead-free BZT-BCT ceramics, with a maximum piezoelectric coefficient $d_{33}$ of approximately 400 pC/N. A system with a slight variation in the composition of $(Ba_{0.88}Ca_{0.12})(Zr_{0.12}Ti_{0.88})O_3$ was moreover prepared, the piezoelectric coefficient $d_{33}$ of which drastically dropped to 215 pC/N.

The majority of thin films of ferroelectric ceramics may be deposited on silicon substrates coated with platinum, of the Pt(111)/Ti/SiO$_2$/Si(100) type, with a composition close to the morphotropic phase boundaries using various deposition methods: sputtering pulsed-laser ablation, screen-printing, metal-organic chemical vapor deposition, and methods of sol-gel deposition and chemical solution deposition (CSD).

Chemical solution deposition (CSD), and in particular deposition of solutions obtained using the sol-gel technique, affords some advantages on account of the low temperatures that may be employed, the homogeneity of composition, the possibility of covering extensive surface areas of the substrate, and the simplicity of the process as compared to other methods, such as physical-deposition methods.

The sol-gel technique consists in mixing metal-organic compounds (principally metal alkoxides) in an organic solvent. The subsequent addition of water generates two reactions: one of hydrolysis, and one of condensation.

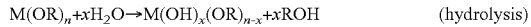

M-OR+MOH→M-O-M+R—OH or

These reactions lead to the formation of a three-dimensional lattice of particles.

The sol precursor may then be dried and calcined to obtain a crystalline ceramic or alternatively may be stabilized via a fine control of the competitive reactions, and the reagents may be used for producing thin films.

In the literature, various sol-gel syntheses of BZT-BCT have been proposed that use the following reagents.

| Ba source | Ca source | Ti source | Zr source | Solvent/ Chelating agent | El./piezoel. characteristics |
|---|---|---|---|---|---|
| Met. Ba | Ca(NO$_3$)$_2$ | TiIP | ZrIP | 2-MOE | ε: ~3000<br>tanδ: 0.06<br>P$_r$: 15.8 μC/cm$^2$<br>E$_c$: 58 kV/cm<br>d$_{33}$: 71.7 pm/V |
| BaAc | CaAc | TiBut | ZrON | ETOH/<br>H$_2$O<br>HAc | P$_r$: 22.15 mC/cm<br>E$_c$: 68.06 kV/cm |
| BaAc | Ca—Ac | TiIP | Zrn-P | 2-MOE<br>HAc | ε: 457<br>tanδ: 0.031<br>D$_{max}$: 0.86 nm<br>J: ~6 × 10$^5$ A/cm<br>P: 141 μC/m$^2$ K<br>F$_d$: 0.50 × 10$^5$ Pa$^{-1/2}$ |
| BaAc | Ca—Ac | TiIP | Zrn-P | 2-MOE<br>HAc | d$_{33}$: 113.6 pm/V |

(BaAc = barium acetate; CaAc = calcium acetate; TiIP = titanium isopropoxide; ZrIP = zirconium isopropoxide; ZrON = zirconium oxynitrate; ZrAcAc = zirconium acetylacetate; TiBut = titanium butoxide; Zrn-P = zirconium n-propoxide; HAc = acetic acid; 2-MOE = 2-methoxy ethanol; ETOH = ethanol; AcAc = acetylacetone)

As may be noted, the most widely employed sol-gel systems are those that use 2-methoxyethanol (2-MOE) as solvent. However, 2-methoxyethanol is highly toxic for humans.

Furthermore, the systems that do not make use of 2-MOE lead to the formation of unstable sol solutions that gel in a short time, rendering difficult storage of the solution and its subsequent use in the deposition of piezoelectric thin films.

BRIEF SUMMARY

Certain embodiments of the present disclosure provide a new precursor solution and a new method for the synthesis of piezoelectric materials of the BZT-BCT type that does not make use of solvents that are carcinogenic and mutagenic for humans or toxic for the environment; and that generates a clear and stable sol solution without forming a gel.

More specifically, the present disclosure provides a new precursor solution preparing a BZT-αBXT type ceramic, wherein, B is Ba, Z is Zr, X is selected from Ca, Sn, Mn, and Nb, T is Ti, and α is a molar fraction selected in the range between 0.10 and 0.90, said precursor solution comprising:

1) at least one barium precursor compound;
2) at least one metal precursor compound selected from the group consisting of a calcium precursor compound, a tin precursor compound, a manganese precursor compound, and a niobium precursor compound;
3) at least one anhydrous zirconium precursor compound;
4) at least one anhydrous titanium precursor compound;
5) one or more solvents selected from the group consisting of polyols, alcohols, carboxylic acids, esters, ketones, and ethers; and
6) a chelating agent.

BRIEF DESCRIPTION OF THE SEVERAL VIEWS OF THE DRAWINGS

The present disclosure will now be described in detail with reference to the annexed drawings, wherein.

DETAILED DESCRIPTION

Figure 1:
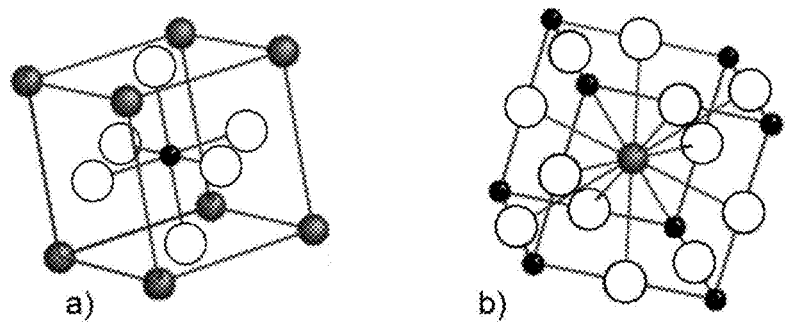
FIG. 1 illustrates the unit of the cell of an ideal cubic perovskite of the ABO$_3$ type.
Figure 2:
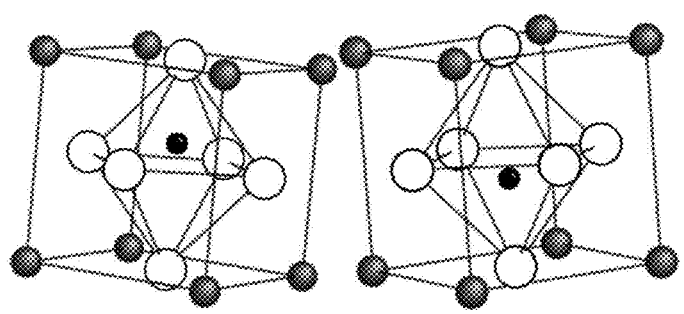
FIG. 2 illustrates the tetragonal ferroelectric distortion of the perovskite structure in the two polarization states.
Figure 3:
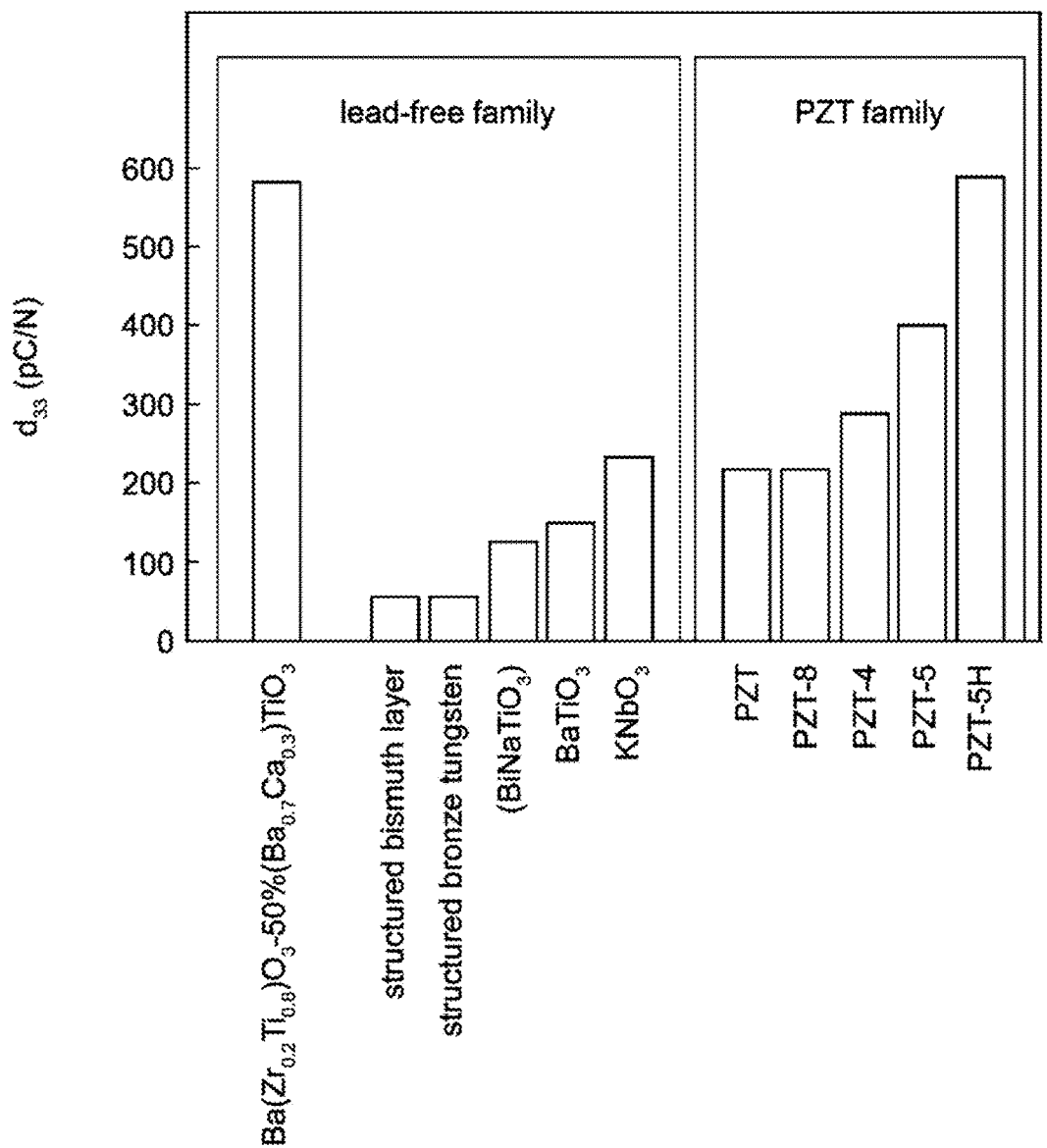
FIG. 3 illustrates the piezoelectric properties d$_{33}$ of piezoelectric materials in MPB composition.

According to one embodiment of the present disclosure, a precursor solution is provided for the preparation of a ceramic of the BZT-αBXT type, where X is selected from the group consisting of Ca, Sn, Mn, and Nb, and α is a molar fraction selected in the range between 0.10 and 0.90, the precursor solution comprising:
1) at least one barium precursor compound;
2) at least one metal precursor compound selected from the group consisting of a calcium precursor compound, a tin precursor compound, a manganese precursor compound, and a niobium precursor compound;
3) at least one anhydrous zirconium precursor compound;
4) at least one anhydrous titanium precursor compound;
5) one or more solvents selected from the group consisting of polyols alcohols, carboxylic acids, esters, ketones, and ethers; and
6) a chelating agent.

In various embodiments, the at least one barium precursor compound and/or the at least one metal precursor compound is anhydrous or dehydrated.

In various embodiments, the one or more solvents include one or more polyols and a secondary solvent selected from the group consisting of alcohols, carboxylic acids, esters, ketones, ethers and a combination thereof.

By the term "precursor solution" is understood a mixture containing all the components used to form a BZT-BXT ceramic following upon appropriate treatment.

Metal Precursor Compounds

In the present text, by "barium precursor compound", "calcium precursor compound", "tin precursor compound", "manganese precursor compound", "niobium precursor compound", "zirconium precursor compound", and "titanium precursor compound" are understood compounds to which an oxygen-containing or nitrogen-containing organic group is bonded, respectively, to the metal element Ba, Ca, Sn, Mn, Nb, and Zr and Ti, through an oxygen or nitrogen atom of the organic group. The choice of the metal precursors determines the nature of the cations of the sites A and B of the perovskite structure.

In some embodiments, the barium precursor compound or any one of the metal precursor compounds (e.g., calcium) may be in anhydrous or dehydrated form. It has been found, in fact, that the presence of residual water deriving from hydration of the precursor compounds during preparation of the precursor solution leads to instability thereof, with consequent gelling.

In particular, the precursor compounds of Ca, Ba, Zr, Ti, Sn, Nb, and Mn may be chosen in the group consisting of metal alkoxides, metal-diol complexes, metal-thiol complexes, metal carboxylates, metal-3-diketonate complexes, metal-3-diketoester complexes, metal-3-iminoketo complexes, metal-amine complexes, more in particular, metal alkoxides, and their partial hydrolytes and metal carboxylates.

Anhydrous forms of the metal precursor compounds are typically commercially available. Hydrated form of the metal precursor compounds may be used provided a dehydrating step is carried out to remove the water before forming a precursor solution.

Examples of a precursor compound of Ca include acetates, such as calcium acetate ($Ca(OAc)_2$), and alkoxides, such as calcium diisopropoxide ($Ca(OiPr)_2$).

Examples of a precursor compound of Ba include acetates, such as barium acetate ($Ba(OAc)_2$), and alkoxides, such as barium diisopropoxide ($Ba(OiPr)_2$).

Examples of a precursor compound of Ti comprise alkoxides, such as titanium tetraethoxide ($Ti(OEt)_4$), titanium tetraisopropoxide ($Ti(OiPr)_4$), titanium tetra-n-butoxide ($Ti(OnBu)_4$), titanium tetraisobutoxide ($Ti(OiBu)_4$), titanium tetra-t-butoxide ($Ti(OtBu)_4$), or titanium dimethoxy diisopropoxide ($Ti(OMe)_2(OiPr)_2$), more in particular titanium tetrabutoxide and titanium isopropoxide.

The hydration enthalpy for titanium isopropoxide is considerably higher than that of titanium tetrabutoxide (EH=−64.9 kJ/mol), and this may be put down to its being a monomeric species (i.e., there are no oligomeric bonds between the alkoxide molecules).

Since titanium isopropoxide lacks oligomeric bonds, the monomers may be attacked from all sides by water without first undergoing de-polymerization.

Titanium tetrabutoxide is, instead, trimeric (i.e., the fundamental unit is formed by three identical monomers bonded in an oligomeric way). Consequently, a considerable amount of energy is consumed to break the oligomeric bonds before hydrolysis may start, leading to a low hydration enthalpy (EH=−19.3 kJ/mol). Consequently, without the presence of chelating agents even in small amounts, titanium butoxide is hydrolytically more stable, and hence less reactive, than titanium isopropoxide, which has a much more negative enthalpy of hydrolysis and tends to decompose in the presence of even small amounts of water.

In any case, with high values of chelating agent as compared to the values of titanium and zirconium, titanium isopropoxide becomes more stable than titanium butoxide, probably on account of a more complete exchange of ligands.

Examples of precursor compounds of Zr are zirconium n-propoxide, zirconium tetraethoxide ($Zr(OEt)_4$), zirconium tetraisopropoxide ($Zr(OiPr)_4$), zirconium tetra-n-butoxide ($Zr(OnBu)_4$), zirconium tetraisobutoxide ($Zr(OiBu)_4$), zirconium tetra-t-butoxide ($Zr(OtBu)_4$), or zirconium dimethoxy diisopropoxide ($Zr(OMe)_2(OiPr)_2$), more in particular zirconium n-propoxide.

Examples of a precursor compound of Mn include manganese acetate.

Furthermore, examples of precursor compounds of Nb include niobium pentaethoxide.

Among precursor compounds of Ti and Zr particularly indicated are the alkoxides that are favoured on account of their high reactivity and capacity of formation of the desired phases at low reaction temperatures, whereas among the compounds of Ba and Ca carboxylates are favoured.

Solvent

The choice of the solvent is linked to the desire to identify a means in which the precursor compounds of Ba, Ca, Sn, Mn, Nb, and Zr and Ti selected are mutually compatible, but above all to the desire to obtain a clear and stable sol solution.

It has been found that the presence of residual water deriving from hydration of the metal compounds, from environmental humidity, or from residue in the solvents leads to precipitation of the gel in the sol solution, thus determining its instability.

It is consequently desired to reduce to the minimum the presence of residual water during the preparation of the gel solution.

It has been noted that the use of precursor compounds in association with a solvent selected from the group consisting of polyols, alcohols, carboxylic acids, esters, ketones, ethers, and their mixtures enables sol solutions to be obtained that remain clear and stable over time.

Other considerations in the choice of the solvent include their viscosity, availability, stability, and toxicity.

In what follows, by the term "polyol" is meant an alkyl compound, possibly branched, containing at least two carbon atoms and at least two OH groups.

In particular, the polyol may be a diol. Specific examples of diols include propylene glycol, ethylene glycol, and 1,3-propanediol, in particular propylene glycol and ethylene glycol.

In some embodiment, the presence of a polyol as component of the solvent improves the stability in conservation of the composition.

Polyols, in addition to being able to co-dissolve the metal-organic compounds, also have a higher viscosity than the solvents commonly used in the prior art, enabling the production via spin-coating of thicker BZT-BXT films without cracks.

One or more secondary solvents or co-solvents may be combined with one or more polyols. In various embodiments, the secondary solvent may be selected from the group consisting of alcohols, carboxylic acids, esters, ketones, ethers, and mixtures thereof.

Examples of alcohols that may be used as secondary solvent are ethanol, 1-butanol, 1-propanol, 2-propanol, 2-butanol, isobutyl alcohol, 1-pentanol, 2-pentanol, 2-methyl-2-pentanol, in particular ethanol and 1-butanol.

Examples of carboxylic acids that may be used as secondary solvent are acetic acid, n-butyric acid, x-methyl butyric acid, i-valeric acid, 2-ethyl butyric acid, 2,2-dimethyl butyric acid, 3,3-dimethyl butyric acid, 2,3-dimethyl butyric acid, 3-methylpentanoic acid, 4-methylpentanoic acid, 2-ethylpentanoic acid, 3-ethylpentanoic acid, 2,2-dimethylpentanoic acid, 3,3-dimethylpentanoic acid, 2,3-dimethylpentanoic acid, 2-ethylhexanoic acid, and 3-ethylhexanoic acid.

Examples of esters that may be used as secondary solvent are ethyl acetate, propyl acetate, n-butyl acetate, sec-butyl acetate, ter-butyl acetate, isobutyl acetate, n-amyl acetate, sec-amyl acetate, ter-amyl acetate, and isoamyl acetate.

Examples of ketones that may be used as secondary solvent are acetone and methylethylketone.

Examples of ethers that may be used as secondary solvent are dimethyl ether or diethyl ether.

Chelating Agent

To stabilize the metal compounds upon decomposition, in particular the titanium and zirconium compounds, chelating agents may be used.

The chelating agents act both by physically surrounding the cation in solution (steric hindrance) and by binding directly thereto in order to reduce their chemical reactivity (inductive effect).

Examples of chelating agents are acetylacetone (2,2-pentanedione, or AcAc), acetic acid (HAc), glycerol, propylene glycol, diethanolamine, EDTA (ethylenediaminetetraacetic acid), and triethanolamine.

Acetylacetone substitutes some or all of the ligands of the alkoxide and, since the ligands of AcAc are not rapidly hydrolysable, the overall hydrolysis rate of the chelated sol is reduced. The amount of chelating agent has an effect on the hydrolysis rate, on the size of the particles, on the condensation process, and on formation of the perovskite phase. It has been shown that the ligands of AcAc remain tightly bound to the metal cation after hydrolysis and condensation, and high temperatures may be employed for their complete removal: an excess of AcAc may cause failure of synthesis of material that presents a pure perovskite phase.

Also acetic acid (HAc) may be used for reducing the reactivity of titanium alkoxides. Gelling and precipitation in sols containing titanium alkoxides may be suppressed with the addition of moderate amounts of acetic acid. In any case, when the amount of acetic acid is high, insoluble species of acetate may form, thus preventing direct crystallization in the perovskite phase and increasing the lack of homogeneity in the sol solution and hence in the film deposited thereby. Consequently, the selection of an appropriate amount of acetic acid in relation to the amounts of titanium and zirconium may affect the production of homogeneous films when acetic acid is used as chelating agent.

Further Components

In addition, the present composition contains, as viscosizing agent with high molecular weight, a polyvinylpyrrolidone (PVP) and a polyethylene glycol.

Polyvinylpyrrolidone and polyethylene glycol are used for adjusting the viscosity of the solution in the composition and reducing or eliminating cracks in the film.

Preparation Method

According to another aspect, a method is provided for preparation of a precursor solution for the production of a ceramic of the BZT-$\alpha$BXT type, where X is selected from Ca, Sn, Mn, and Nb, and $\alpha$ is a molar fraction selected in the range between 0.10 and 0.90, the method comprising the steps of:

1) providing a first solution by dissolving at least one barium precursor compound and at least one metal precursor compound selected from the group consisting of a calcium precursor compound, a tin precursor compound, a manganese precursor compound, and a niobium precursor compound, in one or more solvents selected from the group consisting of polyols alcohols, carboxylic acids, esters, ketones, and ethers;

2) providing a second solution by dissolving at least one anhydrous titanium precursor compound and at least one anhydrous zirconium precursor compound in a chelating agent to obtain a second solution; and 3) mixing said first and second solutions to obtain the precursor solution.

The precursor compounds of Ca and Ba, Zr, Ti, Sn, Nb, and Mn may each be dissolved separately in its own solvent, and the solutions thus obtained may then be mixed together.

Alternatively, in the preparation of the precursor solution, it is possible to prepare a first solution of Ba—Ca and a second solution of Ti—Zr, and then mix these two solutions to obtain a clear and stable precursor solution.

In some embodiment, the one of more solvent includes one or more polyol and a secondary solvent selected from the group consisting of alcohols, carboxylic acids, esters, ketones, ethers, and mixtures.

In certain embodiments, the barium precursor compound and the metal precursor compounds (Ca, Sn, Nb, and Mn) are anhydrous or dehydrated. The dehydrated precursors of barium, calcium, tin, manganese, and niobium may be obtained by dissolving a metal precursor compound of one of these elements in non-anhydrous or hydrated form in a solvent chosen from polyols, alcohols, carboxylic acids, esters, ketones, ethers, and mixtures thereof, and subsequently dehydrating the resulting solution to obtain the dehydrated metal precursor compound. The dehydrated metal precursor compound or compounds can then be re-dissolved in a solvent selected from the group consisting of polyols, alcohols, carboxylic acids, esters, ketones, ethers, and mixtures thereof to provide the first solution.

In some embodiments, the metal precursor compounds are metal alkoxides which, during hydrolysis, favor formation of M-O-M bonds, thereby helping to preserve the homogeneity of the precursor solution during the gelling process.

Even though metal alkoxides are very difficult to handle, are generally very sensitive, even to mere traces of humidity, and tend to decompose rapidly, they are used in CSD reactions on account of their capacity to hydrolyze and condense to form long chains of oligomers (porous three-dimensional metal-organic structures), which, after calcining, shrink to form xerogels (that are prevalently anhydrous and porous).

These porous xerogels create dense and crystalline films during the sintering (annealing) step. The guiding force in formation of the film is the reduction of the surface energy or the surface pressure on account of the capillary forces that cause contraction of the solid lattice.

When polyols are chosen as solvents, it is possible to minimize the effect of the residual water deriving from water of crystallization of the starting compounds of Ca and Ba, Zr, Ti, Sn, Nb, and Mn and to stabilize the precursor solution, thus obtaining a stable and clear solution that may be stored for subsequent use.

According to a further aspect, a piezoelectric material made of a ceramic of the BZT-αBXT type is provided, where X is selected from Ca, Sn, Mn, and Nb, and α is a molar fraction selected in the range between 0.10 and 0.90, said ceramic being obtained from a precursor solution described above. This material may be in the form of film.

In particular, the piezoelectric material may be in the form of film or powder and may be used instead of conventional PZTs, for example in applications such as sensors for airbags, fuel piezo-injectors, ignition sources for gas lighters, detonation sensors, angle sensors for motor vehicles, hard disks, ink-jet print heads, touch sensors for PC monitors, atomization sources for humidifiers and inhalers, smoke detectors, devices for cleaning jewelry and contact lenses, accelerometers, pollution detectors, flow meters, detectors of air bubbles in tubes, impact sensors, level indicators, micropositioning equipment, pressure sensors, non-destructive ultrasound cleaning devices, ultrasound degreasers, ultrasound grinders, welders, ultrasound apparatuses, dental appliances, nebulizers, ultrasound therapy, sonars, orientation systems, optical and acoustic microphones, speakers, tweeters, resonators, filters, microactuators for scanning electron microscopes and cameras, and non-volatile memories.

Figure 4:
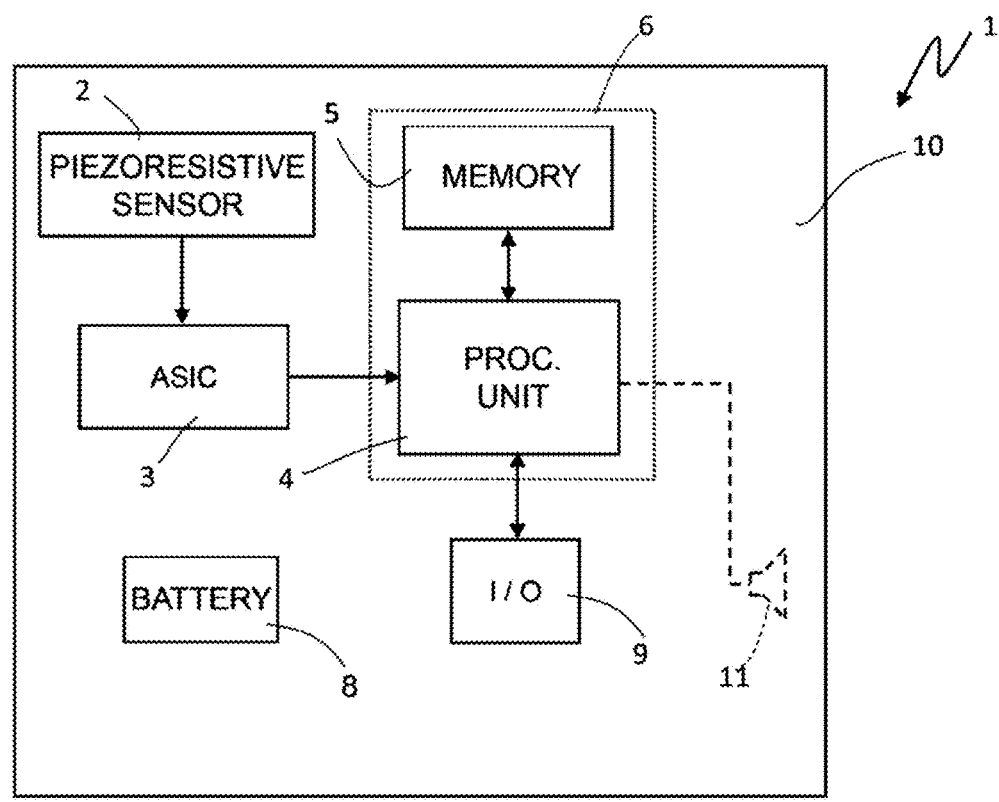
FIG. 4 shows a simplified diagram of the architecture of an apparatus that uses a MEMS device englobing a piezoelectric region obtained with the present solution.

FIG. 4 is a schematic illustration of an electronic apparatus 1 that uses a MEMS sensor 2 of a piezoelectric type.

The electronic apparatus 1 comprises, in addition to the MEMS device 2: an ASIC 3 connected to the MEMS device 2; a processing unit 4, for example a microprocessor, connected to the ASIC 5; a memory 5, connected to the processing unit 4; a battery 8 for supplying the various blocks of the electronic apparatus 1; and an input/output interface 9, which is also connected to the processing unit 4. Furthermore, a speaker 11 may be present for generating a sound on an audio output (not shown) of the electronic apparatus 1.

In a way known and not shown herein, the MEMS device 2 comprises a suspended region, for example a membrane, carrying a layer of piezoelectric material, as described above, and supplies, on an output, electrical signals correlated to the deformation of the suspended region. The ASIC 5 is electrically coupled to the MEMS device 2 so as to receive the electrical signals generated by the latter and supply to the outside world the values of the physical quantities detected as a result of the deformation of the MEMS device and/or of quantities correlated thereto.

Furthermore, the electronic apparatus 1 may be fixed to a supporting body 10, for example constituted by a printed circuit board.

According to yet another aspect, there is provided a method for the preparation of a film of a piezoelectric material made of a ceramic of the BZT-αBXT type, where X is selected from Ca, Sn, Mn, and Nb, and α is a molar fraction selected in the range between 0.10 and 0.90, said method comprising depositing on a substrate the precursor solution described above, calcining the precursor solution to provide a thin film on the substrate, and sintering the thin film.

In particular, the precursor solution may be applied by spin-coating on an appropriate substrate, for example a silicon substrate coated with platinum. Next, the solution is calcined and sintered (by annealing) at high temperatures in the presence of oxygen to obtain a homogeneous crystalline film.

In particular, the calcining step may be conducted at a temperature between 300° C. and 450° C., and the sintering step at a temperature of 550-850° C. This enables thin films to be obtained that are dense and without cracks. This cycle of deposition, calcining, and sintering may be repeated a number of times to obtain films of different thicknesses stacked on one another.

Possibly, prior to the calcining step, a drying step may be carried out to remove the solvent, in particular at a temperature of between 100° C. and 200° C.

Where it is instead necessary to obtain a piezoelectric material in the form of powder, the precursor solution is first calcined at a temperature of between 300° C. and 450° C., and subsequently sintered at a temperature of 700-1200° C.

Further characteristics will emerge from the ensuing description of some merely illustrative and non-limiting examples.

Example 1

BZT-BCT in EG-HAc—Preparation and Characterization

All the starting materials (barium acetate [$Ba(CH_3COO)_2$], calcium acetate monohydrate [$Ca(CH_3COO)_2 \cdot H_2O$], tetrabutyl titanate [$Ti(OC_4H_9)_4$], and zirconium isopropoxide [$Zr(OC_3H_7)_4$] 70% sol in 1-propanol) were of analytical grade and were used without further purification.

Ethylene glycol and ethanol were used as solvents, whereas glacial acetic acid was used as chelating agent.

In the synthesis of the precursor solution, Ba—Ca and Ti—Zr solutions were produced separately.

The solution A was prepared by dissolving BaAc and CaAc separately in ethylene glycol at 70° C. and then by stirring for 30 min.

The solutions were then mixed together at 100° C. and stirred for 1 h to form the Ba—Ca solution.

For the solution B, to suppress hydrolysis on account of the environmental humidity of TiBut, an appropriate amount of glacial acetic acid was first added to the exactly weighed amount of TiBut, stirring for 20 min. Next, ZrIP was added and stirred at room temperature for 1 h to form Ti—Zr solution.

Finally, the solution B was mixed to the solution A, and ethanol was added up to the concentration of 0.4M, stirring for 3 h at room temperature to obtain a BZT-BCT precursor solution (BZT-BCT solution).

The BZT-BCT solution was then filtered through a PTFE syringe filter, 0.45 μm, and preserved in a glovebox.

The clear and colorless BZT-BCT solution obtained was stable and free from precipitation or gelling.

Powders were then prepared by drying the precursor solution at 150° C. for 24 h, leading to formation of a precipitated gel. The resulting gel was dried over night, and the solidified lumps were ground with a mortar and pestle to obtain fine powders.

The powders were then sintered at 950° C. for 2 h to obtain formation of phase and to remove the non-reacted materials from the powders as synthesized.

The thermal behavior of the powders of the white precursor deriving from the dried gel was analyzed by DTA (Differential Thermal Analysis) in air atmosphere. The recordings were made by varying the temperature from room temperature to 1200° C., with a heating rate of 10° C./min.

Figure 5:
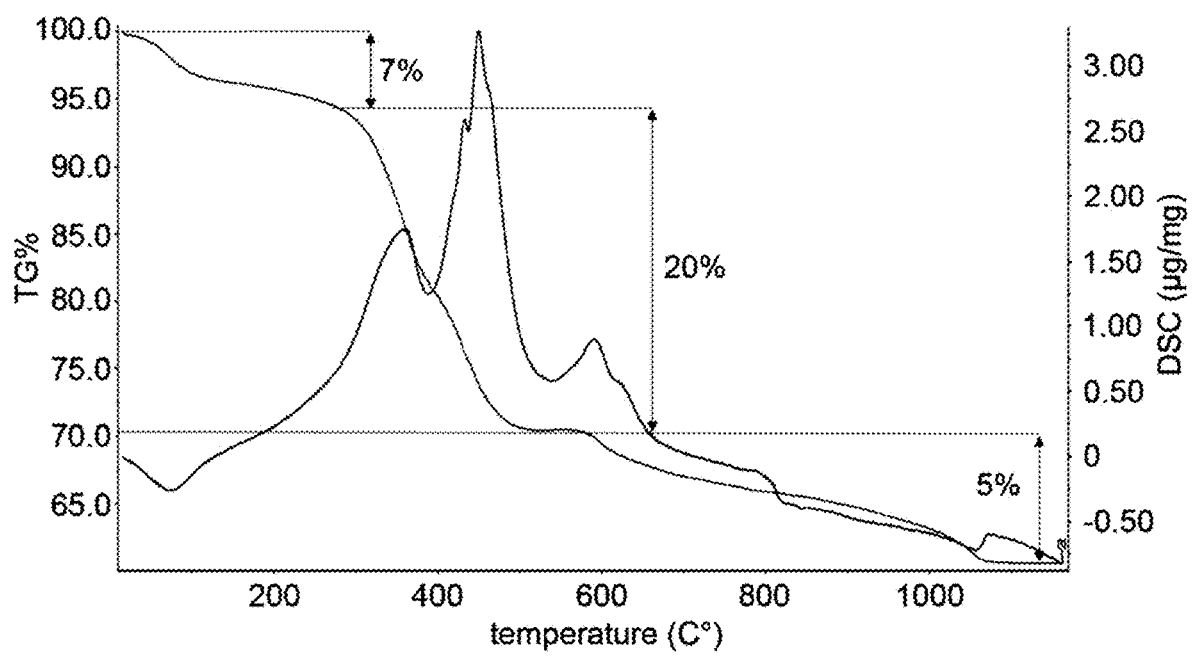
FIG. 5 illustrates the DTA thermogram for a dried sample of BZT-0.5BCT (EG-HAc) from room temperature to 1200° C., measured at a heating rate of 10° C./min with an airflow of 20.0 mL/min.

The TGA curve (FIG. 5) reveals a first loss of weight between room temperature and 300° C., with losses of 7% of the total weight, which may be attributed to evaporation of non-structural water and of the residual solvents. This causes an endothermic peak at 90° C.

The second loss of weight (~25%) regards destruction of the lattice of the xerogel and subsequent loss of organic substances, as well as initial formation of BZT-0.5BCT.

The subsequent three exothermic peaks between 350° C. and 550° C. reveal the reactions of combustion and synthesis of intermediate products of reaction, i.e., Ti and Zr carbonates and oxides. The last peak at approximately 600° C. shows an exothermic effect that may be put down to decomposition of $BaCO_3$ and $CaCO_3$ and hence to the reaction for formation of BZT-0.5BCT, with 5% losses of the total weight.

Figure 6:
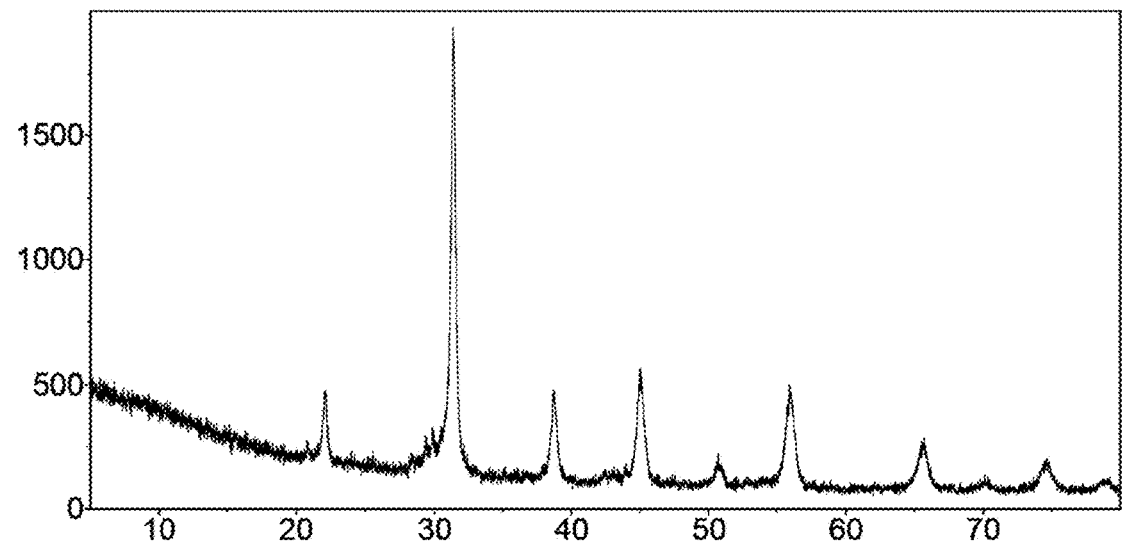
FIG. 6 illustrates the XRD spectrum of a BZT-0.5BCT powder precursor obtained by sintering at 950° C. of a precursor solution containing EG as solvent and HAc as chelating agent.

The XRD spectra (FIG. 6) obtained from the sintered BZT-BCT powders (at 950° C.) show the characteristic peaks of monophase perovskite. The absence of further peaks in the XRD data indicates the phase purity of the samples prepared and the efficiency of the synthesis and of the chemical procedures.

Example 2

BZT-BCT in EG-AcAc—Preparation and Characterization

All the starting materials (barium acetate [$Ba(CH_3COO)_2$], calcium acetate monohydrate [$Ca(CH_3COO)_2 \cdot H_2O$], titanium isopropoxide, and zirconium isopropoxide [$Zr(OC_3H_7)_4$] 70% sol in 1-propanol) were of analytical grade and were used without further purification.

TiBut and ZrIP were accurately preserved and handled in a glovebox, but in nitrogen atmosphere with low humidity content.

Ethylene glycol was used as solvent, and acetylacetone was used as chelating agent in a molar ratio AcAc:[Ti+Zr]= 1.

In the synthesis of the precursor, Ba—Ca and Ti—Zr solutions were produced separately.

The solution A was prepared by dissolving separately BaAc and CaAc in ethylene glycol at 70° C. and then stirring for 30 min.

The solutions were then mixed together at 100° C. and stirred for 1 h to form the Ba—Ca solution.

For the solution B, TiIP and ZrIP were carefully added to AcAc and stirred for 30 min at 80° C. in reflux conditions.

Finally, the two solutions A and B were mixed together and stirred at 120° C. in reflux conditions to obtain a clear 0.4M solution, amber in color.

The BZT-BCT precursor solution was then filtered through a PTFE syringe filter, 0.45 μm, and preserved in a glovebox.

The clear and colorless solution obtained was stable and free from precipitation or gelling.

Powders were then prepared by drying the precursor solution at 150° C. for 24 h, leading to formation of precipitated gel. The resulting gel was dried over night, and the solidified lumps were ground with a mortar and pestle to obtain fine powders.

The powders were then sintered at 950° C. to obtain phase formation and to remove the non-reacted materials from the powders as synthesized.

The thermal behavior of the powders of the white precursor deriving from the dried gel was analyzed by means of DTA (Differential Thermal Analysis) in an air atmosphere. The recordings were made by varying the temperature from room temperature to 1200° C., with a heating rate of 10° C./min.

The TGA curve reveals a first loss of weight between room temperature and 300° C., with losses of approximately 7% of the total weight, which may be put down to evaporation of non-structural water and of the residual solvents. This causes a small endothermic peak at approximately 90° C.

The second loss of weight (10%) regards a destruction of the lattice of the xerogel and subsequent loss of organic substances, and initial formation of BZT-0.5BCT.

The subsequent three exothermic peaks between 350° C. and 550° C. reveal the reactions of combustion and synthesis of intermediate products of reaction, i.e., Ti and Zr carbonates and oxides.

Figure 7:
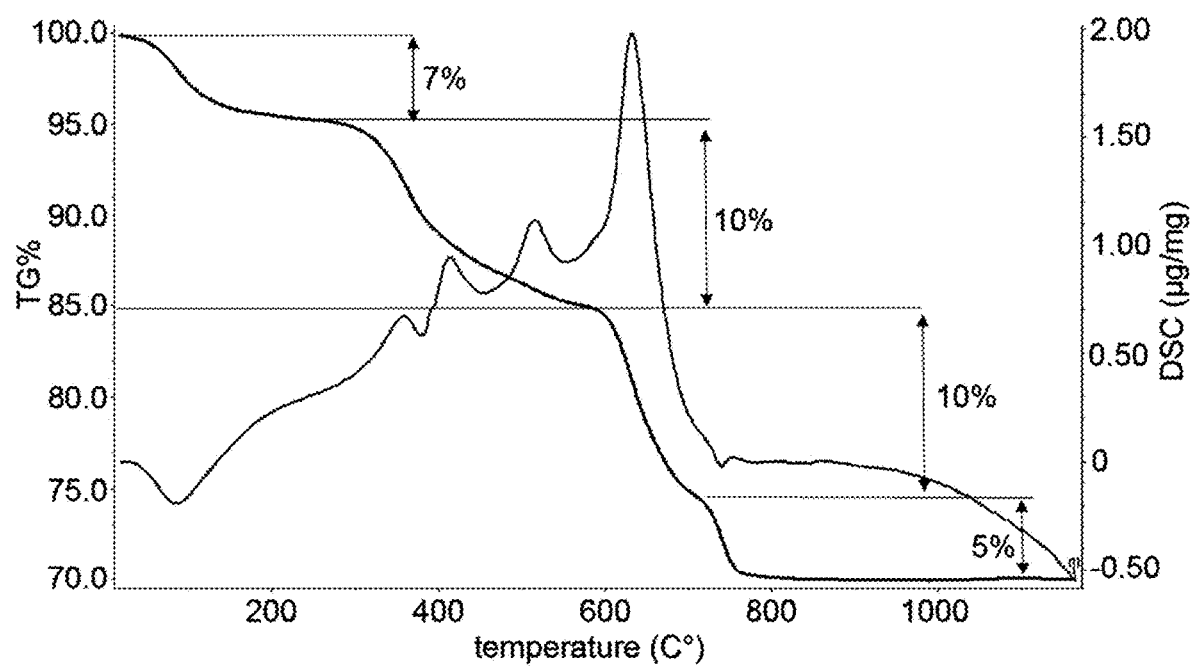
FIG. 7 illustrates the DTA thermogram for dried BZT-0.5BCT (EG-AcAc) from room temperature to 1200° C., measured at a heating rate of 10° C./min in air, with an airflow of 20.0 mL/min.

The last peak at approximately 640° C. shows an exothermic effect with approximately 10% of loss of weight that may be put down to decomposition of $BaCO_3$ and $CaCO_3$, and hence to the reaction for formation of BZT-0.5BCT. Formation of BZT-0.5BCT is completed at approximately 770° C., as illustrated in FIG. 7.

The sintered powders and the sintered pellets were subjected to X-ray diffraction studies to confirm the phase formation.

Figure 8:
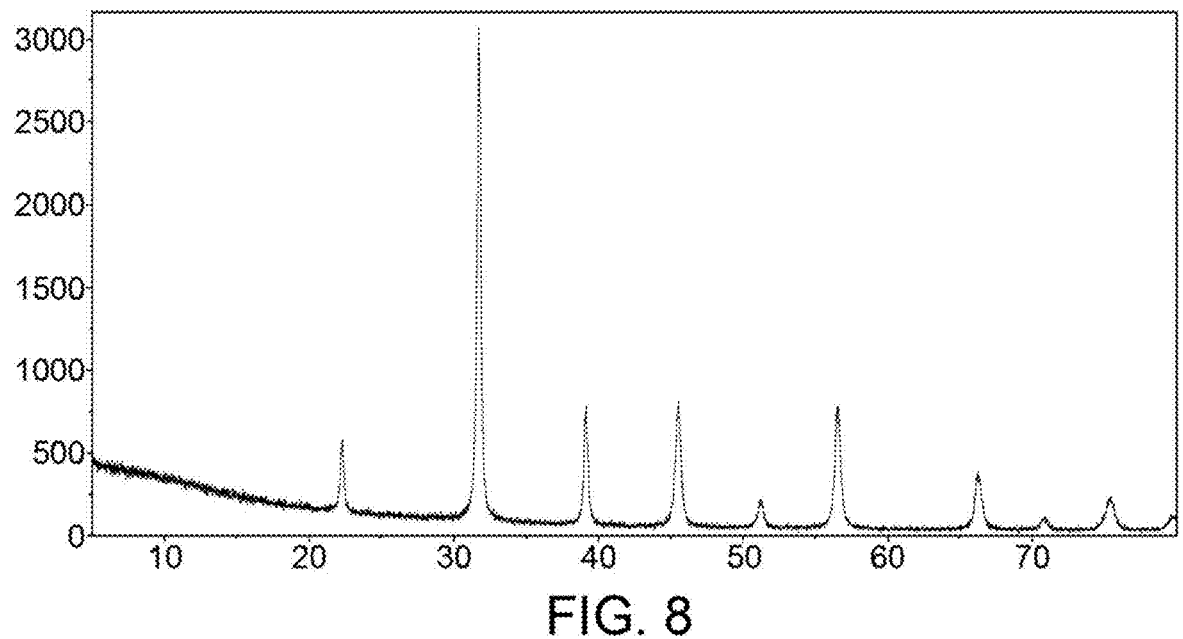
FIG. 8 illustrates the XRD spectrum of a BZT-0.5BCT powder precursor obtained by sintering at 950° C. of a precursor solution containing EG as solvent and AcAc as chelating agent.

FIG. 8 shows the X-ray diffraction spectrum of a sintered BZT-BCT sample. For both samples, a monophase tetragonal perovskite structure is evident in the XRD data at room temperature.

The absence of further peaks in the XRD data indicates the phase purity of the samples prepared and the efficiency of the synthesis and of the chemical procedures.

Example 3

BZT-BCT Thin Films (EG-HAC)

Presented hereinafter is an example of preparation of a thin film according to the disclosure, as well as its characterization.

Two thin films were prepared by depositing, by spin coating, the BZT-BCT solution (EG-HAc) at 2000 rpm for 40 s on clean platinum-coated silicon substrates. The deposited films were treated thermally at 150° C. for 5 min and at 450° C. for 5 min. This cycle was repeated to obtain films of different thicknesses. The films were re-baked in an oven at high temperature for 1 h at 850° C. in air atmosphere.

Figure 9:
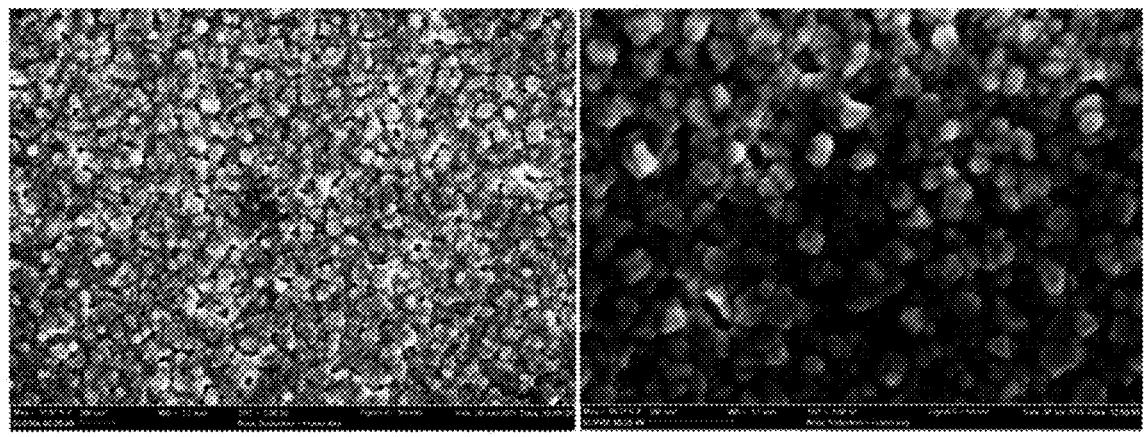
FIG. 9 illustrates a SEM image of a thin film obtained from a precursor solution comprising ethylene glycol as solvent and acetic acid as chelating agent.

The SEM images of the thin films obtained (appearing in FIG. 9) show a dense film and grains with high uniformity.

A crystalline structure of the BZT-BCT thin films was characterized via X-ray diffraction. The XRD data on the thin films suggested a non-oriented perovskite structure.

Figure 10:
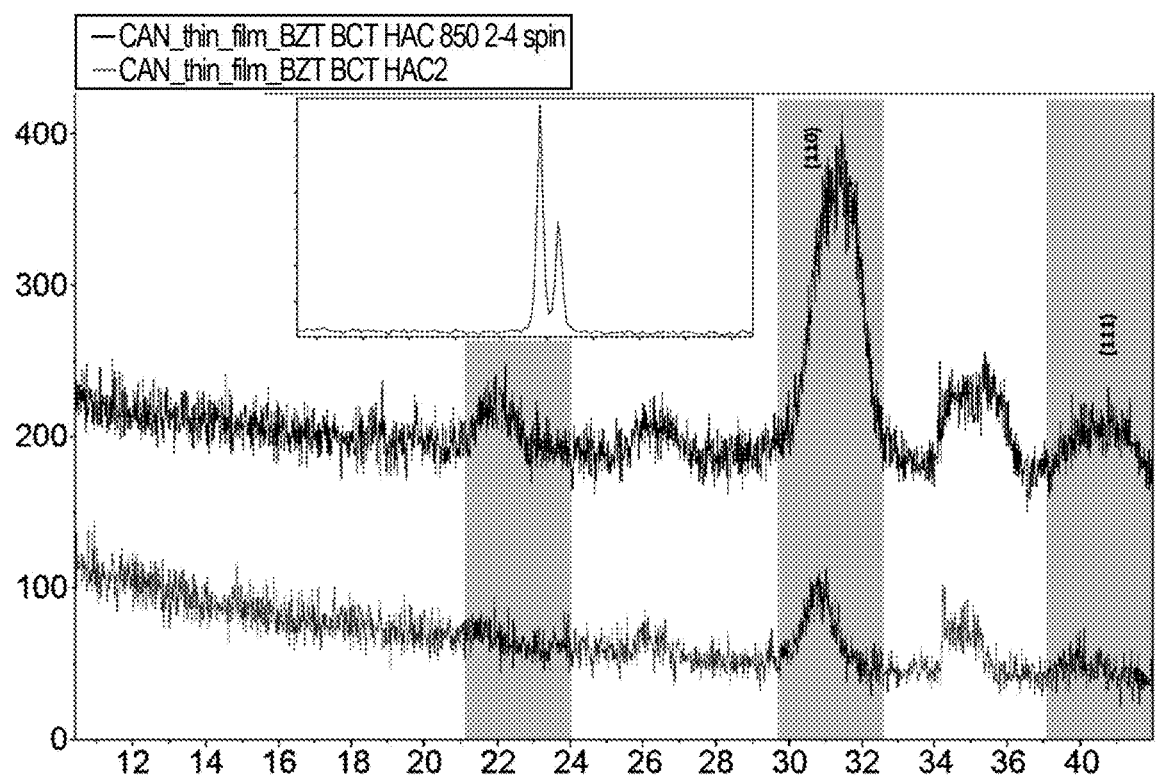
FIG. 10 illustrates the XRD spectrum of a thin film obtained from a BZT-BCT precursor solution sintered at 800° C.

In FIG. 10, the peaks at 22°, 32°, and 38° (top curve) are in fact visible with 2θ scanning ($\omega=2°$) for both of the thin films, i.e., the 1-spin (bottom curve), and the 4-spin (top curve), respectively. The peaks at 26° and 36° may be put down to the Si—$TiO_2$—Pt substrate.

The insert in FIG. 10 shows the peak (100) with the components $k\alpha 1$ and $k\alpha 2$ of Cu radiation, at $2\theta=32°$, and θ-2θ fast scanning (time per step=2 s).

Figure 11:
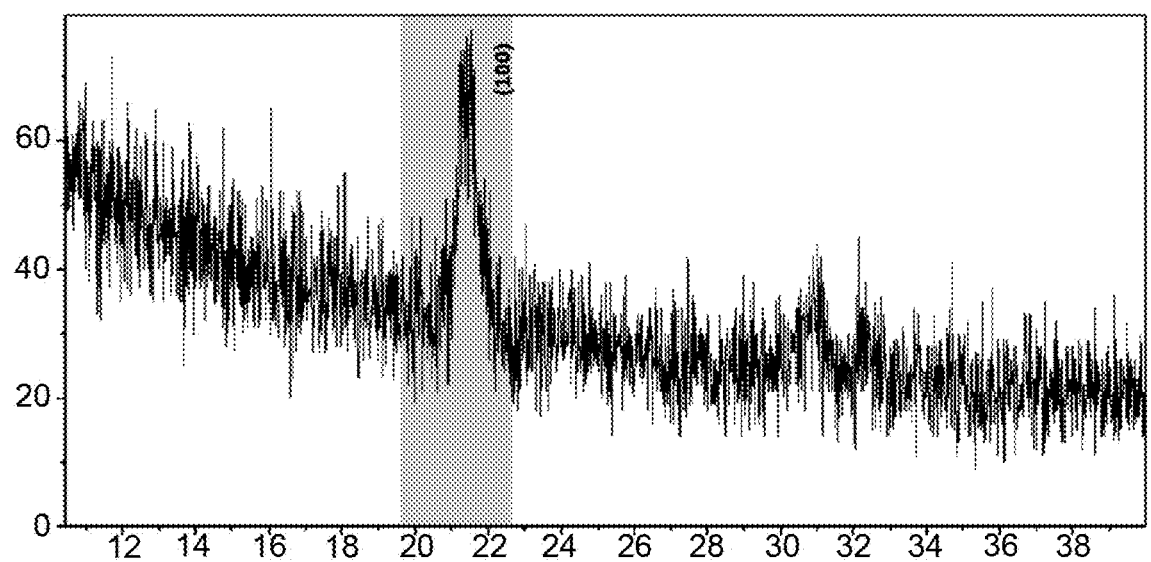
FIG. 11 illustrates the XRD spectrum of a monolayer thin film obtained from a BZT-0.5BCT precursor solution sintered at 800° C., with a seed layer.

To improve the quality of crystallization of the film a thin seed layer was inserted between the film and the Pt(111)/Ti/$SiO_2$/Si substrate using a sol-gel process. The crystalline structures of the thin films were analyzed by XRD (2θ scanning, $\omega=1°$) as indicated in FIG. 11. The monolayer thin films appeared to have mainly a (100) orientation.

Example 4

BZT-BCT in HAc—Preparation and Characterization

All the starting materials (barium acetate [Ba($CH_3$COO)$_2$], calcium acetate monohydrate [Ca($CH_3$COO)$_2$.$H_2O$], tetrabutyl titanate [Ti($OC_4H_9$)$_4$], and zirconium isopropoxide [Zr($OC_3H_7$)$_4$] 70% sol in 1-propanol) were of analytical grade and were used without further purification.

As chelating agent and solvent glacial acetic acid and 1-butanol were used, respectively.

The solution A was prepared in a rotary evaporator by dissolving acetate of barium and calcium in stoichiometric proportions in a mixture of acetic acid and deionized water, and by stirring for 30 min in an oil bath at 50° C. Then, the solution was refluxed at 120° C. to eliminate the water, and the dehydrated powder was re-dissolved in cool acetic acid.

For the solution B, in a glovebox filled with high-purity nitrogen with a content of humidity of less than 3 ppm, precursors of the metal alkoxide were mixed together with acetic acid and stirred at room temperature for 20 min.

The solution B was then added to the solution A via stirring for 2.5 h at room temperature to obtain approximately 0.8M of a clear solution.

Finally, 1-butanol was added to reach the concentration of 0.4M of titanium.

The BZT-BCT solution was then filtered through a PTFE syringe filter, 0.45 μm, and preserved in a glovebox.

The clear and colorless solution obtained was stable and free from phenomena of precipitation or gelling.

Powders were then prepared by drying the precursor solution at 150° C. for 24 h, leading to formation of a precipitated gel. The resulting gel was dried over night, and the solidified lumps were ground with a mortar and pestle to obtain fine powders.

The powders were then sintered at 950° C. for 2 h to obtain formation of phase and to remove the non-reacted materials from the powders as synthesized.

The thermal behaviors of the powders of the white precursor deriving from the dried gel were analyzed by DTA (Differential Thermal Analysis) in air atmosphere. The recordings were made by varying the temperature from room temperature to 1200° C., with a heating rate of 10° C./min.

The TGA curve reveals a first loss of weight between room temperature and 300° C., with losses of 5% of the total weight which may be attributed to evaporation of non-structural water and of the residual solvents. This causes an endothermic peak at 90° C.

The second loss of weight regards destruction of the lattice of the xerogel and subsequent loss of organic substances, as well as initial formation of BZT-0.5BCT.

Figure 12:
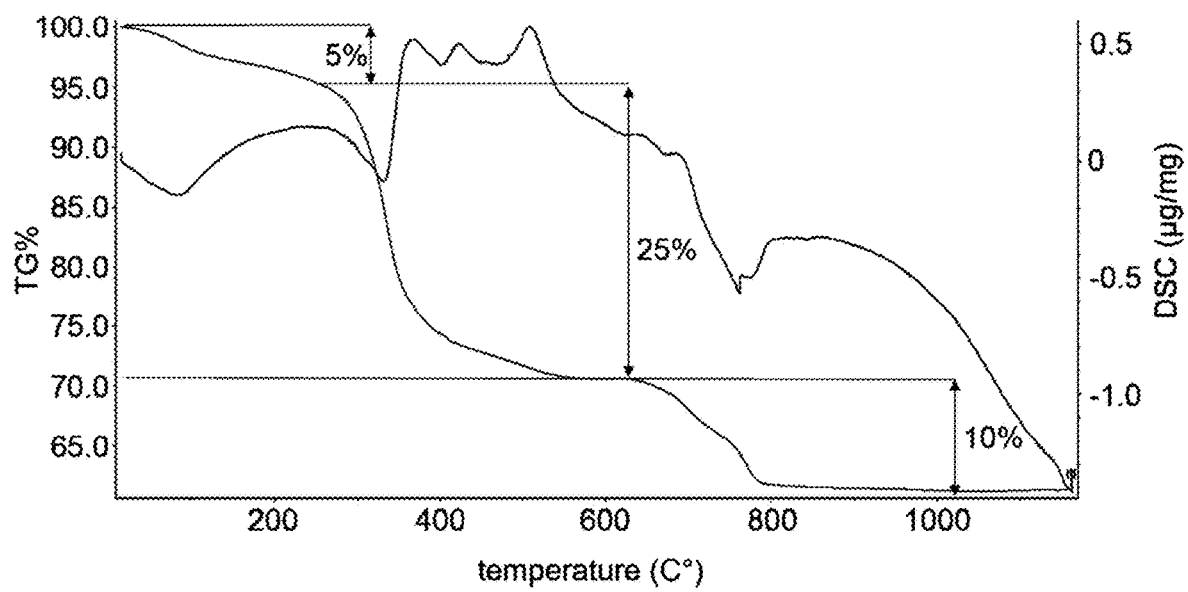
FIG. 12 illustrates the DTA thermogram for a dried sample of BZT-0.5BCT (HAc) measured at a heating rate of 10° C./min with an airflow of 20.0 m L/min.

The subsequent three exothermic peaks between 350° C. and 550° C. reveal the reactions of combustion and synthesis of intermediate products of reaction, i.e., Ti and Zr carbonates and oxides, whereas the peak attributed to decomposition of carbonates is not evident. Formation of BZT-0.5BCT is completed at approximately 780° C., as illustrated in FIG. 12.

The sintered powders and the sintered pellets were subjected to X-ray diffraction studies to confirm phase formation.

Figure 13:
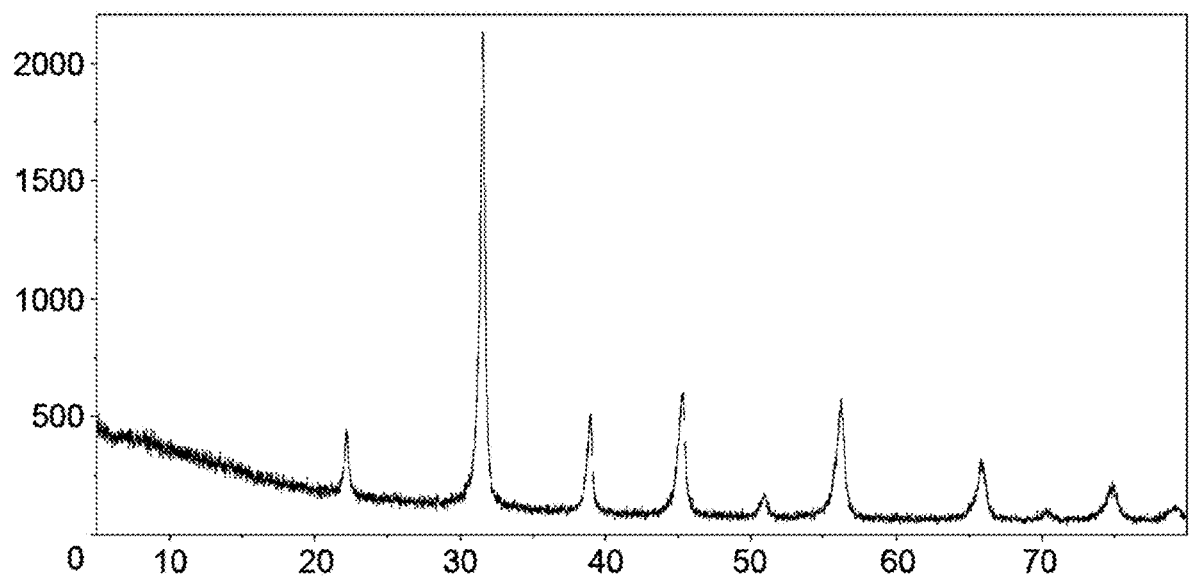
FIG. 13 illustrates the XRD spectrum of a BZT-0.5BCT powder precursor obtained by sintering at 950° C. a precursor solution containing HAc as solvent and chelating agent.

FIG. 13 shows the X-ray diffraction spectrum of a sintered sample of BZT-BCT, where a monophase tetragonal perovskite structure is evident in the XRD data at room temperature. The absence of further peaks in the XRD data indicates the phase purity of the samples prepared and the efficiency of synthesis and of the chemical procedures.

Example 5

BZT-BCT (HAc-AcAc)—Preparation and Characterization

All the starting materials (barium acetate [Ba($CH_3$COO)$_2$], calcium acetate monohydrate [Ca($CH_3$COO)$_2$.$H_2O$], titanium propoxide [Ti($OC_4H_9$)$_4$] and [Zr($OC_3H_7$)$_4$] 70% sol in 1-propanol) were of analytical grade and were used without any further purification.

As chelating agent and solvent, glacial acetic acid and 1-butanol were used, respectively.

The solution A was prepared in a rotary evaporator by dissolving acetate of barium and calcium in stoichiometric proportions in a mixture of acetic acid and deionized water and by stirring for 30 min in an oil bath at 50° C. Then, the solution was refluxed at 120° C. to eliminate the water, and the dehydrated powder was re-dissolved in cool acetic acid.

For the solution B, in a glovebox filled with high-purity nitrogen with a content of humidity of less than 3 ppm, TiIP ZrIP were carefully added to AcAc and mixed for 30 min at 80° C. in reflux conditions.

Then, the two solutions were mixed together and stirred at 80° C. in reflux conditions for 2 h to obtain a clear solution, amber in color.

Finally, 1-butanol was added to reach the concentration of 0.4M of titanium and was stirred for 1 h at room temperature.

The BZT-BCT solution was then filtered through a PTFE syringe filter 0.45 μm, and preserved in a glovebox.

The clear amber solution obtained was stable and free from phenomena of precipitation or gelling.

Powders were then prepared by drying the precursor solution at 150° C. for 24 h, leading to formation of precipitated gel.

The resulting gel was dried overnight, and the solidified lumps were ground with a mortar and pestle to obtain fine powders.

The powders were then sintered at 950° C. for 2 h to obtain phase formation and to remove the non-reacted materials from the powders as synthesized.

The thermal behaviors of the powders of the white precursor deriving from the dried gel were analyzed by means of DTA, in air atmosphere. The recordings were made by varying the temperature from room temperature to 1200° C., with a heating rate of 10° C./min.

The TGA curve reveals a first loss of weight between room temperature and 300° C., with losses of 7% of total weight that may be attributed to evaporation of non-structural water and of the residual solvents. This causes an endothermic peak at 90° C.

The second loss of weight (25%) regards a destruction of the lattice of the xerogel and the subsequent loss of organic substances, and initial formation of BZT-0.5BCT.

Figure 14:
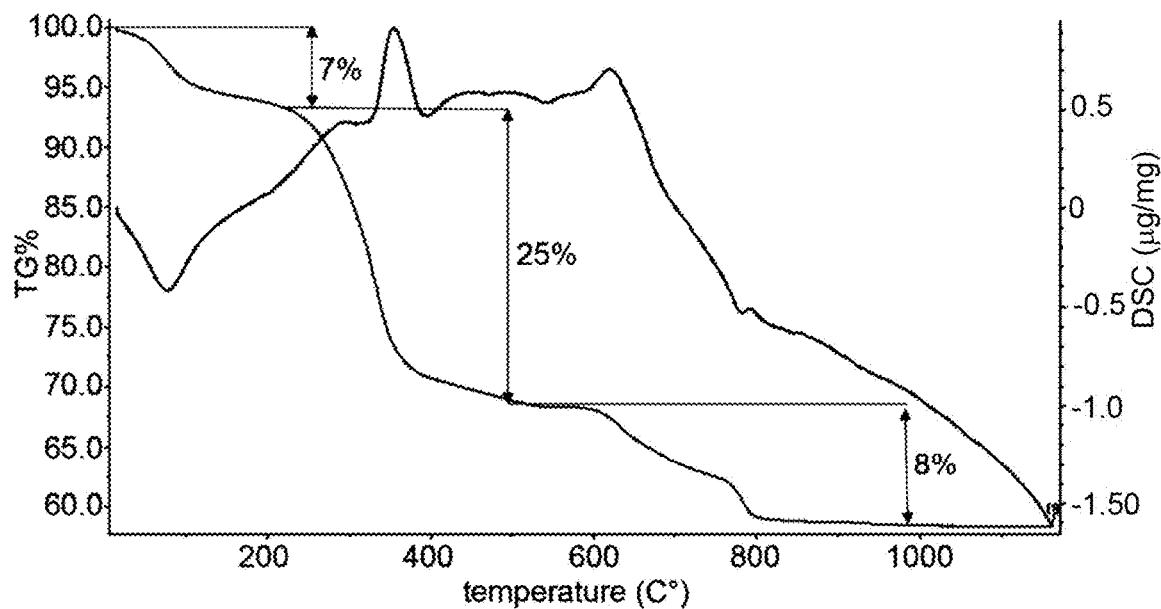
FIG. 14 illustrates the DTA thermogram for a dried sample of BZT-0.5BCT (HAc-AcAc) measured at a heating rate of 10° C./min with an airflow of 20.0 mL/min.

The last peak at 640 is attributed to decomposition of the carbonates. Formation of BZT-0.5BCT is completed at approximately 800° C., as shown in FIG. 14.

The sintered powders were subjected to X-ray diffraction studies to confirm phase formation.

Figure 15:
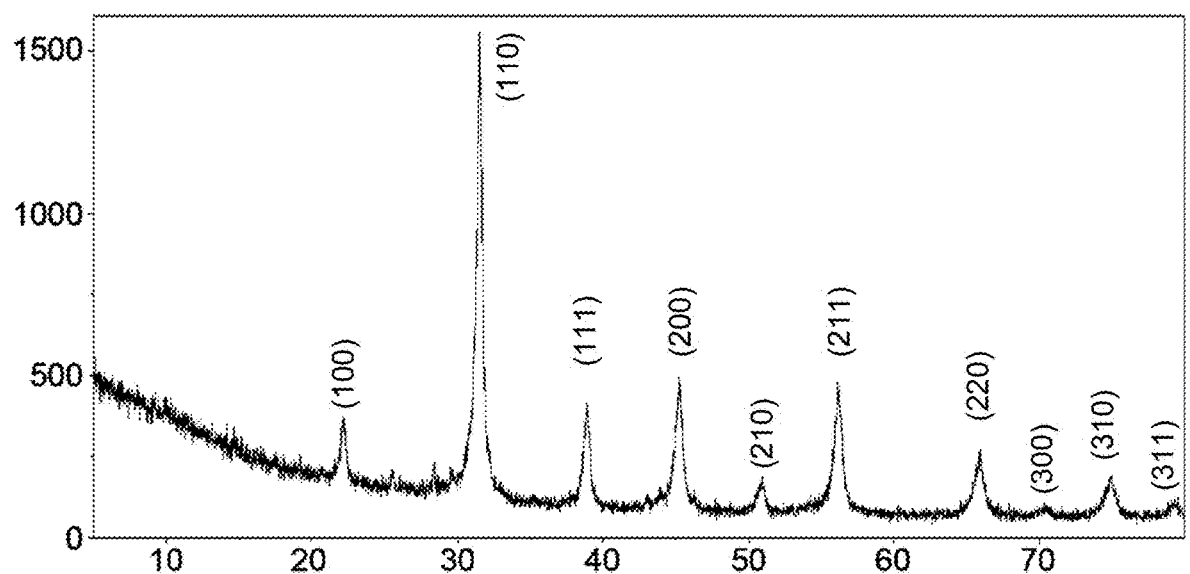
FIG. 15 illustrates the XRD spectrum of a BZT-0.5BCT powder precursor obtained by sintering at 950° C. a precursor solution containing HAc as solvent and AcAc as chelating agent.

FIG. 15 shows the X-ray diffraction spectrum of a sintered BZT-BCT sample, where a monophase tetragonal perovskite structure is evident in the XRD data at room temperature. The absence of further peaks in the XRD data indicates the phase purity of the samples prepared and the efficiency of the synthesis and of the chemical procedures.

The invention claimed is:

1. A lead-free precursor solution for preparing a BZT-$\alpha$BXT type ceramic having a piezoelectric coefficient of 200 to 710 pC/N, wherein, B is barium, Z is zirconium, X is selected from calcium, tin, manganese, and niobium, T is titanium, and $\alpha$ is a molar fraction selected in the range between 0.10 and 0.90, said precursor solution consisting of:
   1) at least one barium precursor compound;
   2) at least one metal precursor compound selected from the group consisting of a calcium precursor compound, a tin precursor compound, a manganese precursor compound, and a niobium precursor compound;
   3) at least one anhydrous zirconium precursor compound;
   4) at least one anhydrous titanium precursor compound;
   5) a solvent consisting of ethylene glycol and a secondary solvent selected from 3-methylpentanoic acid, 4-methylpentanoic acid, 2-ethylpentanoic acid, 3-ethylpentanoic acid, 2,2-dimethylpentanoic acid, 3,3-dimethylpentanoic acid, 2,3-dimethylpentanoic acid and 3-ethylhexanoic acid adapted to dissolve the at least one barium precursor compound and at least one of the calcium precursor compound, the tin precursor compound, the manganese precursor compound, and the niobium precursor compound;
   6) a chelating agent,
   and 7) a viscosizing agent selected from the group consisting of polyvinlypyrrolidone and polyethylene glycol wherein said precursor compounds of calcium, barium, zirconium, titanium, tin, niobium, and manganese are selected from the group consisting of metal alkoxides, metal-diol complexes, metal-thiol complexes, metal carboxylates, metal-3-diketonate complexes, metal-3-diketoester complexes, metal-3-iminoketo complexes, and metal-amine complexes.

2. The precursor solution of claim 1 wherein the at least one barium precursor compound and the at least one metal precursor compound are anhydrous or dehydrated.

3. The precursor solution according to claim 1, wherein said barium precursor compound is barium diisopropoxide.

4. The precursor solution according to claim 1, wherein said calcium precursor compound is calcium diisopropoxide.

5. The precursor solution according to claim 1, wherein said titanium precursor compound is selected from the group consisting of titanium tetraethoxide, titanium tetraisopropoxide, titanium tetra-n-butoxide, titanium tetraisobutoxide, titanium tetra-t-butoxide, and titanium dimethoxy diisopropoxide.

6. The precursor solution according to claim 1, wherein said zirconium precursor compound is selected from the group consisting of zirconium n-propoxide, zirconium tetraethoxide, zirconium tetraisopropoxide, zirconium tetra-n-butoxide, zirconium tetraisobutoxide, zirconium tetra-t-butoxide, and zirconium dimethoxy diisopropoxide.

7. The precursor solution according to claim 1, wherein said chelating agent is selected from the group consisting of acetylacetone (2,2-pentanedione, or AcAc), acetic acid (HAc), glycerol, propylene glycol, diethanolamine, EDTA (ethylenediaminetetraacetic acid), and triethanolamine.

8. A method of preparing the precursor solution of claim 1 comprising:
   1) providing a first solution by dissolving at least one barium precursor compound and at least one metal precursor compound selected from the group consisting of a calcium precursor compound, a tin precursor compound, a manganese precursor compound, and a niobium precursor compound, in a solvent comprising ethylene glycol;
   2) providing a second solution by dissolving at least one anhydrous titanium precursor compound and at least one anhydrous zirconium precursor compound in a chelating agent; and
   3) providing a precursor solution by mixing said first and second solutions, wherein said precursor compounds of calcium, barium, zirconium, titanium, tin, niobium, and manganese are selected from the group consisting of metal alkoxides, metal-diol complexes, metal-thiol complexes, metal carboxylates, metal-3-diketonate complexes, metal-3-diketoester complexes, metal-3-iminoketo complexes, and metal-amine complexes.

9. The method of claim 8 wherein at least one barium precursor compound and the at least one metal precursor compound are anhydrous or dehydrated.

10. A method comprising:
    depositing on a substrate the precursor solution of claim 1 that includes:
    calcining the precursor solution to provide a thin film on the substrate; and
    providing a piezoelectric material film by sintering the thin film, wherein the piezoelectric material film includes a BZT-$\alpha$BXT type ceramic, wherein B is barium, Z is zirconium, X is selected from calcium, tin, manganese, and niobium, T is titanium, and $\alpha$ is a molar fraction selected in the range between 0.10 and 0.90.

11. The method of claim 10 wherein at least one barium precursor compound and the at least one metal precursor compound are anhydrous or dehydrated.

* * * * *